United States Patent

Tanaka et al.

[11] Patent Number: 6,025,579
[45] Date of Patent: Feb. 15, 2000

[54] CERAMIC HEATER AND METHOD OF MANUFACTURING THE SAME

[75] Inventors: Arihito Tanaka; Chihiro Sakurai, both of Saitama-ken, Japan

[73] Assignee: Jidosha Kiki Co., Ltd., Tokyo, Japan

[21] Appl. No.: 09/332,661

[22] Filed: Jun. 14, 1999

Related U.S. Application Data

[63] Continuation-in-part of application No. 08/992,078, Dec. 17, 1997.

[30] Foreign Application Priority Data

Dec. 27, 1996 [JP] Japan ................................. 8-350317

[51] Int. Cl.[7] ........................................... H05B 3/44
[52] U.S. Cl. ........................... 219/544; 219/553; 219/270
[58] Field of Search ..................... 219/544, 270, 219/553, 552, 541, 123, 145 A, 145 R, 361, 264, 265, 266; 501/97.2, 97.3, 97.1, 88, 84, 90, 96.1, 92, 98.1

[56] References Cited

U.S. PATENT DOCUMENTS

| | | | |
|---|---|---|---|
| 4,528,121 | 7/1985 | Matsushita et al. | 252/516 |
| 4,555,358 | 11/1985 | Matsushita et al. | 252/516 |
| 4,613,455 | 9/1986 | Suzuki et al. | 252/516 |
| 4,837,231 | 6/1989 | Endo et al. | 501/91 |
| 4,912,305 | 3/1990 | Tatemasu et al. | 219/544 |
| 4,914,274 | 4/1990 | Hatanaka et al. | 219/270 |
| 4,914,751 | 4/1990 | Masaka et al. | 219/270 |
| 5,362,944 | 11/1994 | Hatanaka et al. | 219/270 |
| 5,439,855 | 8/1995 | Rosenthal | 501/97 |
| 5,750,958 | 5/1998 | Okuda et al. | 219/267 |
| 5,767,027 | 6/1998 | Sakon et al. | 501/98.4 |
| 5,883,360 | 3/1999 | Tatematsu et al. | 219/270 |

FOREIGN PATENT DOCUMENTS

| | | |
|---|---|---|
| 55-126989 | 10/1980 | Japan . |
| 58-110919 | 7/1983 | Japan . |
| 59-230285 | 12/1984 | Japan . |
| 61-115857 | 7/1986 | Japan . |
| 61-179084 | 8/1986 | Japan . |
| 4-257615 | 9/1992 | Japan . |
| 5-1817 | 1/1993 | Japan . |

*Primary Examiner*—Teresa Walberg
*Assistant Examiner*—Vinod D Patel
*Attorney, Agent, or Firm*—Townsend and Townsend and Crew LLP; Kenneth R. Allen

[57] ABSTRACT

A ceramic heater includes a heating element and a sintered body. The heating element is formed of a material containing one of a refractory metal having a melting point of 2,000° C. or more, and a material including an inorganic conductive material. The sintered body of an insulating ceramics contains one of silicon nitride and silicon carbide materials. The heating element is buried in the sintered body. The insulating ceramics contains at least one kind of nitrides of Groups IIIA, IVA, and VA in the element periodic table at a ratio of 0.01 vol % to 10 vol %. A method of manufacturing the ceramic heater is also disclosed.

13 Claims, 3 Drawing Sheets

FIG. 5

CERAMIC HEATER AND METHOD OF MANUFACTURING THE SAME

This application is a continuation-in-part of application Ser. No. 08/922,078, filed Dec. 17, 1997, the disclosure of which is incorporated by reference.

BACKGROUND OF THE INVENTION

The present invention relates to a ceramic heater formed of a high-temperature heating sintered body used in a glow plug and the like for ignition of various heaters and combustors and auxiliary starting of a diesel engine, and a method of manufacturing the same.

A glow plug is used as, e.g., an auxiliary heat source (preheat source) in starting a diesel engine. A known glow plug of this type conventionally, generally has a structure in which a metal heater made of Ni—Cr (nickel-chromium), Fe—Cr (iron-chromium), or the like is buried in a heat-resistant insulating powder such as MgO (magnesia), and the metal heater buried in the heat-resistant insulating powder is covered with a heat-resistant metal sheath.

In a glow plug of this type, the rise time to 800° C. must be shortened, the peak and saturation temperatures must be set higher, and the afterglow time must be prolonged in order to meet today's exhaust gas regulations. To achieve these conditions, a refractory metal must be employed at the heater portion of the heating element. The sheath portion is made of not a metal but a ceramic usable at a high temperature.

For example, Japanese Patent Laid-Open No. 55-126989 discloses, as a ceramic heater used in the above-mentioned glow plug, the structure in which a refractory metal such as W (tungsten) is buried in a silicon nitride insulating ceramics excellent in oxidation resistance and thermal shock resistance.

In this ceramic heater, however, cracking, peeling, and the like occur during sintering, or the resistance of the heater portion becomes unstable because a reaction layer such as a tungsten silicide layer is formed between the metal and the insulating ceramics (particularly on the metal side). Owing to the manufacturing problems described above, the temperature cannot be increased so high in sintering the ceramics, and the ceramics is sintered using a hot pressing.

Even in the hot-press sintering, the maximum sintering temperature is 1,750° C. at most. If the ceramics is sintered at a higher temperature, a reaction layer such as a tungsten silicide layer is confirmed to be formed between the metal and the insulating ceramics.

It is difficult to sinter silicon nitride-based ceramics at 1,750° C. or less unless the amount of sintering aids is increased or low-melting sintering aids are selected. However, when the amount of sintering aids is increased, or the low-melting assistant is selected, high-temperature properties of the silicon nitride-based ceramics degrade. Further, a silicon carbide-based ceramics cannot absolutely be sintered at 1,750° C. or less.

To prevent formation of a reaction layer such as the above tungsten silicide layer, Japanese Patent Laid-Open No. 61-179084 discloses the structure in which the surface of a resistance heating element made of W (tungsten) or Mo (molybdenum) is covered with a non-oxide ceramics.

However, this structure requires an additional step of covering the surface of the resistance heating element with the non-oxide ceramics, resulting in high manufacturing cost. Further, it is difficult that the surface of the coiled W is covered uniformly with a non-oxide ceramics.

SUMMARY OF THE INVENTION

It is an object of the present invention to provide the ceramic heater that a reaction layer on a refractory metal can be prevented and keep the resistance of a refractory metal stable, and a method of manufacturing the same.

It is another object of the present invention to provide a ceramic heater which can be easily manufactured at low cost, and a method of manufacturing the same.

In order to achieve the above objects, according to the present invention, there is provided a ceramic heater comprising a heating element formed of a material containing one of a refractory metal having a melting point of 2,000° C. or more, and a material including an inorganic conductor, and a sintered body of an insulating ceramics containing one of silicon nitride and silicon carbide materials, the heating element being buried in the sintered body, wherein the insulating ceramics contains at least one kind of nitrides of Groups 3b, 4b and 5b in an element periodic table at a ratio of 0.01 vol % to 10 vol %.

DESCRIPTION OF THE PREFERRED EMBODIMENT

The present invention will be described in detail below with reference to the accompanying drawings.

Figure 1:
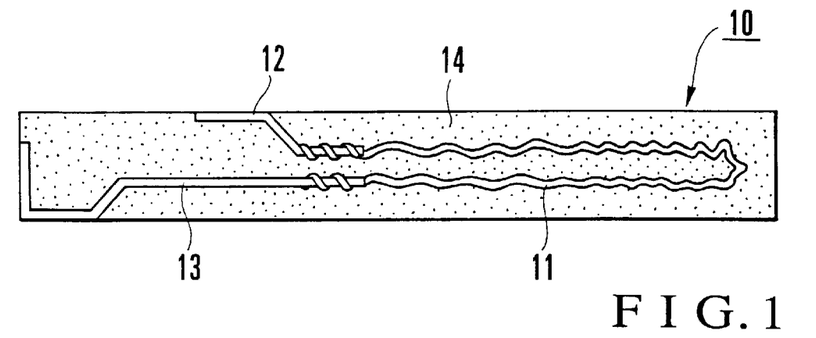
FIG. 1 is a sectional view showing a ceramic heater according to an embodiment of the present invention.

FIG. 1 shows a ceramic heater according to an embodiment of the present invention. In FIG. 1, a ceramic heater 10 is constituted by a heating element 11 made of a refractory metal having a melting point of 2,000° C. or more, leads 12 and 13 respectively connected to the two ends of the heating element 11 and made of a refractory metal having a melting point of 2,000° C. or more, and a sintered body 14 made of a silicon nitride- or silicon carbide-based insulating ceramics. The heating element 11 and the leads 12 and 13 are buried in the sintered body 14 made of the insulating ceramics. The structure shown in FIG. 1 is a ceramic heater in a glow plug disclosed in, e.g., Japanese Utility Model Laid-Open No. 61-115857, and a detailed description thereof will be omitted.

According to the present invention, as described above, a refractory metal having a melting point of 2,000° C. or more is used as the heating element 11 and the leads 12 and 13, and the heating element 11 and the leads 12 and 13 are buried in the sintered body 14 made of a silicon nitride- or silicon carbide-based insulating ceramics, thereby manufacturing the ceramic heater 10. In manufacturing, at least one kind of nitrides of Groups 3b, 4b and 5b in the element periodic table is contained in a silicon nitride- or silicon carbide-based insulating ceramic powder at a ratio of 0.01 vol % to 10 vol %, and sintered at a temperature higher than, e.g., 1,750° C. For the purposes of this application, elements in the subgroups 3b, 4b, and 5b mean those elements shown in a periodic table of the elements commonly in use in the United States of America. An example of such a periodic table of the elements may be found inside the front cover of the *Handbook of Chemistry and Physics,* 56$^{th}$ Edition, CRC Press, 1976, for example. As shown in that example, sub-group 3b includes Y, sub-group 4b includes Ti and Zr, and sub-group 5b includes Nb and Ta. Those skilled in the art will recognize that other examples of the periodic table of the elements may title the subgroups differently. For example, one type of periodic table commonly used in Japan, known as a "long" element periodic table, titles the groups IIIA, IVA, and VA, respectively. Under these sintering conditions, a reaction layer on the refractory metal can be suppressed to 20 $\mu$m or less (0 to 20 $\mu$m) in thickness of cross section. Desirably, the reaction layer is 0 $\mu$m, i.e., is not formed. However, the reaction layer having a thickness of 20 $\mu$m or less does not pose any problem in practical use.

This point will be explained in more detail below. That is, the heating element 11 and the leads 12 and 13 are preferably metal having a melting point of 2,000° C. or more and preferably 2,200° C. or more in order to cause the heating element 11 to generate heat of 1,400° C. or more during heating by the heater and to set the sintering temperature higher than 1,750° C. Examples of this refractory metal are W, Mo, Nb (niobium), Hf (hafnium), and Ir (iridium). The melting point of W is 3,400° C., and that of Mo is 2,617° C.

The silicon nitride-based sintered body in this case is made of an insulating ceramic containing silicon nitride ($Si_3N_4$) as a main component, i.e., a silicon nitride-based ceramics containing so-called sintering aids. Silicon nitride contains an unavoidable impurity such as oxygen mixed in the manufacturing process or the like. Silicon nitride used preferably has a high purity from the viewpoint of sintering properties, migration, and the like. Known sintering aids system represented by an yttria-alumina system, an yttria system, or an ytterbia system can be used. In terms of the high-temperature oxidation resistance and the high-temperature strength, yttria- or ytterbia-based sintering aids is preferably used.

Silicon nitride decomposes (sublimes) at about 2,000° C. The above-mentioned sintering temperature is 1,750° C. or more, which must be lower than the sublimation temperature.

The silicon carbide-based sintered body in this case is made of an insulating ceramic containing silicon carbide (SiC) as a main component, i.e., a silicon carbide-based ceramic containing so-called sintering aids. Silicon carbide used preferably has a high purity from the viewpoint of sintering properties, migration, and the like. Known sintering aids system represented by an alumina system, or a boron-carbon system can be used.

Silicon carbide is known to decompose (sublime) at about 2,400° C. The sintering temperature is preferably set lower than the decomposition temperature, e.g., about 2,100 to 2,200° C. Also at this time, the sintering temperature is preferably be lower than the melting point of the metal.

The present applicant found that, even when a ceramics was sintered at a temperature higher than 1,750° C., a reaction layer on a refractory metal could be suppressed to 20 $\mu$m or less in thickness of cross section by containing a nitride of Group 3b, 4b, or 5b in the element periodic table in a silicon nitride- or silicon carbide-based insulating ceramics at a ratio of 0.01 vol % to 10 vol %. The present invention utilizes this to manufacture the ceramic heater 10 in which the refractory metal is buried in the insulating ceramics.

The above-described advantage is considered to be obtained because the nitride of Group 3b, 4b and 5b prevents decomposition (sublimation) of silicon nitride or silicon carbide and prevents reaction with the refractory metal, i.e., silicification.

Examples of the nitrides of Groups 3b, 4b and 5b are YN, TiN, ZrN, NbN, and TaN. One or more kinds of nitrides can be arbitrarily selected from these examples. From an experiment, TaN could form the thinnest reaction layer on a refractory metal.

If the content of the nitride of Group 3b, 4b and 5b is lower than 0.01 vol %, the reaction layer becomes thicker than 20 $\mu$m. As the results of various experiments, if the reaction layer becomes thicker than 20 $\mu$m, microcracks occur in the sintered body made of the insulating ceramic. When this sintered body is used as a ceramic heater, the durability becomes very low.

If the content of the nitride is higher than 10 vol % or more, the oxidation resistance of the sintered body itself degrades. When this sintered body is used as a ceramic heater, the durability becomes low. As for the oxidation resistance, an oxidation test in the atmosphere at 1,400° C. for 144 h was conducted to find that the properties of the ceramic heater were unpreferable if the oxidation weight increase was larger than 1.5 mg/cm$^2$.

From these results, the content must be 0.01 vol % to 10 vol %. Preferably, the content is about 1 vol % in consideration of the oxidation resistance and the high-temperature strength.

More specifically, if the nitride of Group 3b, 4b and 5b in the element periodic table is contained in the silicon nitride- or silicon carbide-based insulating ceramics at a ratio of 0.01 vol % to 10 vol %, the reaction layer on the refractory metal can be suppressed to 20 $\mu$m or less in thickness of cross section. Accordingly, the resistance of the heating element 11 and the leads 12 and 13 made of the refractory metal are stabilized, and the sintered body 14 does not crack, resulting in a long service life of the ceramic heater 10. This can be considered that the nitride of Group 3b, 4b and 5b prevents decomposition of silicon nitride or silicon carbide, and prevents reaction with the refractory metal, i.e., silicification.

According to the present invention, since the ceramics can be sintered at a temperature higher than 1,750° C., yttria- or ytterbium-based sintering aids difficult to sinter at around 1,700° C. can be used in the silicon nitride-based sintered body. Therefore, the ceramic heater 10 excellent in high-temperature properties and the oxidation resistance can be obtained by sintering. In the silicon carbide-based sintered body, a refractory metal cannot be conventionally buried and sintered. In the present invention, however, since reaction with the refractory metal can be prevented, the silicon carbide material can be sintered at a high temperature.

The sintering temperature of the insulating ceramic must be a temperature which is higher than 1,750° C., prevents decomposition (sublimation) of silicon nitride or silicon carbide, and is lower than the melting point of the refractory metal.

Note that the present invention is not limited to the above-described embodiment. The shape, structure, and the like of the glow plug, which is not entirely illustrated, and those of each portion of the ceramic heater used in the glow plug can be properly modified and changed.

Figure 2:
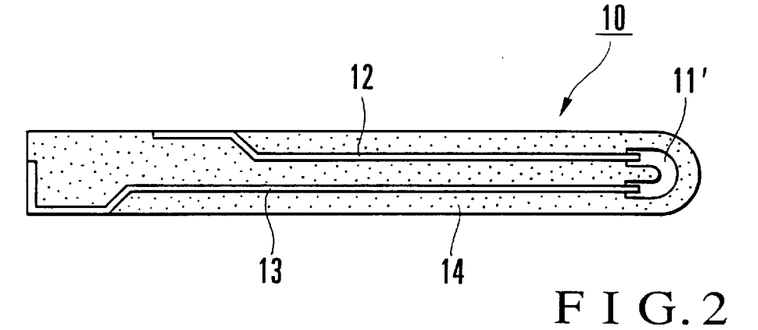
FIG. 2 is a sectional view showing another structure of the ceramic heater in FIG. 1.

For example, the ceramic heater may have a shape and structure conventionally, widely known. FIG. 2 shows the ceramic heater 10 in which a U-shaped heating element 11' made of a material including an inorganic conductor material is buried in the distal end portion, and the refractory metal leads 12 and 13 extending from the two ends of the heating element 11' are buried in the sintered body 14 made of an insulating ceramics. In this case, the same effect as that of the ceramic heater in FIG. 1 can be obtained by forming the leads 12 and 13 of a refractory metal.

Figure 3:
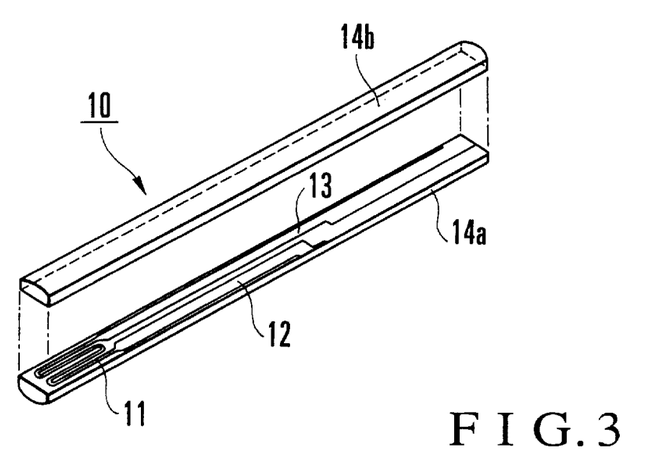
FIG. 3 is an exploded perspective view showing still another structure of the ceramic heater in FIG. 1.

FIG. 3 shows the ceramic heater of a glow plug disclosed in, e.g., Japanese Patent Laid-Open No. 59-230285. In this case, the ceramic heater 10 is formed by sandwiching the heating element 11 and the leads 12 and 13 made of a refractory metal between calcined (semi-sintered) body 14a and 14b made of a ceramic powder, and sintering the whole structure. Even in the ceramic heater 10 having this structure, the same effect as that of the ceramic heater in FIG. 1 can be obtained.

Figure 4:
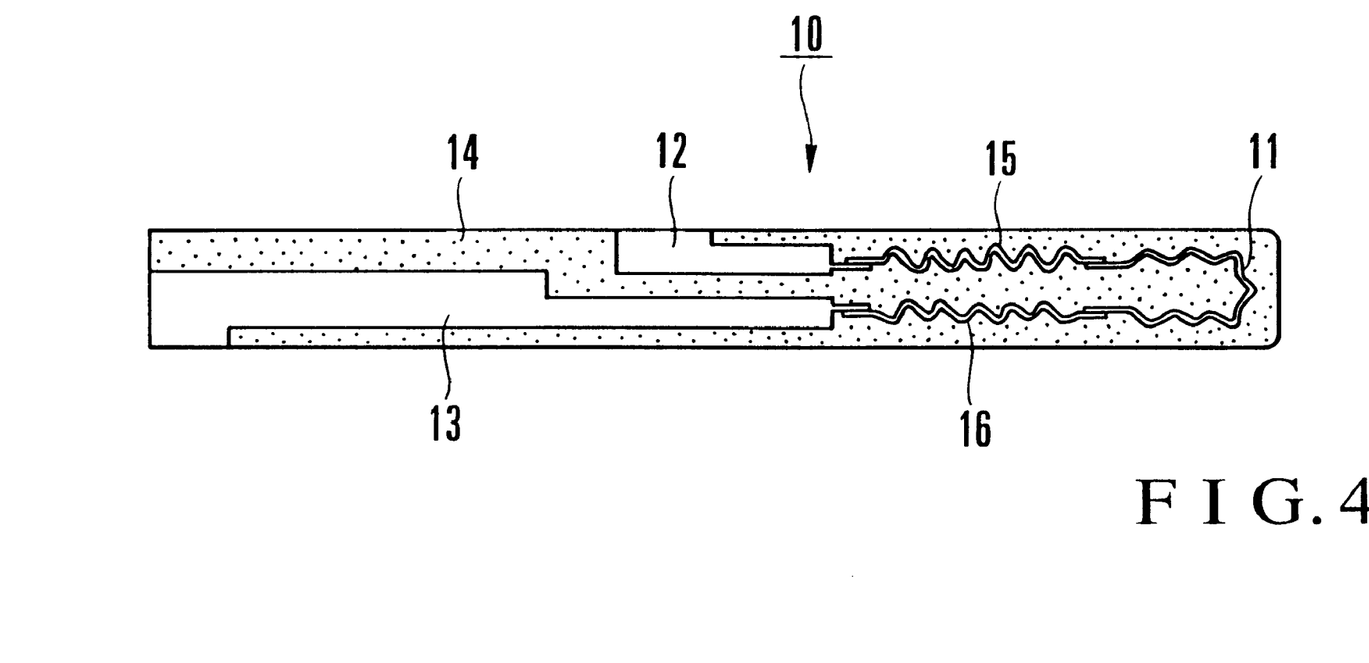
FIG. 4 is a sectional view showing still another structure of the ceramic heater in FIG. 1.

FIG. 4 shows the ceramic heater 10 in which control heating elements 15 and 16 for controlling the temperature of the heating element 11 made of a refractory metal are connected between the heating element 11 and the leads 12 and 13 made of a refractory metal. The obtained structure was buried in the sintered body 14 made of an insulating ceramic. The ceramic heater 10 having this structure is disclosed in, e.g., Japanese Patent Laid-Open No. 58-110919. The same effect as that of the ceramic heater in FIG. 1 can be obtained.

Figure 5:
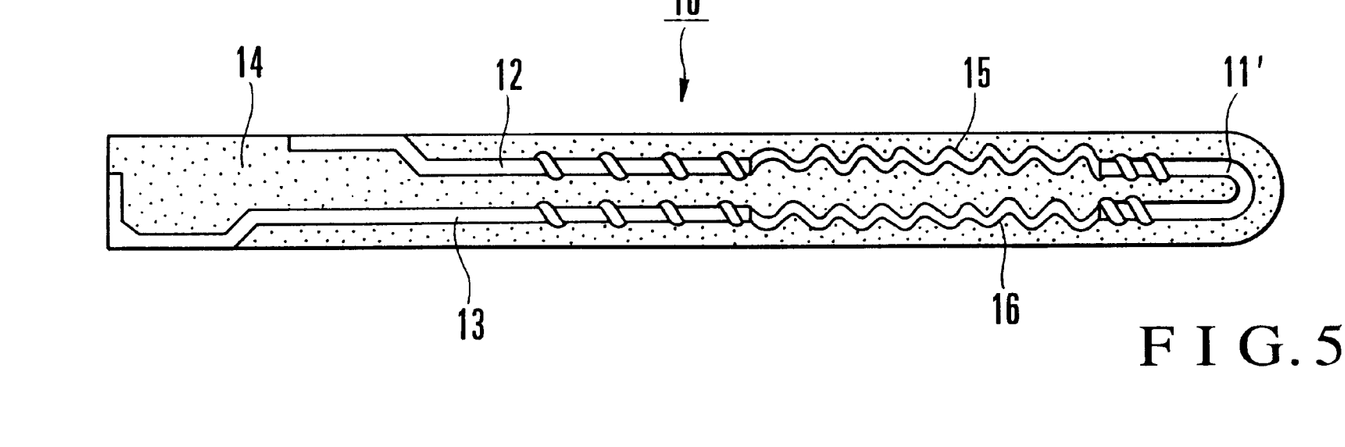
FIG. 5 is a sectional view showing still another structure of the ceramic heater in FIG. 1.

FIG. 5 shows the ceramic heater 10 having the same structure as that in FIG. 4, which is disclosed in, e.g., Japanese Patent Laid-Open No. 4-257615. The ceramic heater shown in FIG. 5 also has the same effect as that of the ceramic heater in FIG. 1.

EXAMPLE 1

Table 1 shows an example in which silicon nitride-based insulating ceramics were sintered using a hot pressing.

TABLE 1

| Sample No. | Composition of Silicon Nitride-Based Ceramics (wt %) | | | | | | Added Nitride | |
|---|---|---|---|---|---|---|---|---|
| | $Si_3N_4$ | $Y_2O_3$ | $Al_2O_3$ | $HfO_2$ | $SiO_2$ | $Yb_2O_3$ | Type | Amount (vol %) |
| 1 | 88 | 4 | 8 | 0 | 0 | 0 | TaN | 1 |
| 2 | 90 | 5 | 5 | 0 | 0 | 0 | TaN | 1 |
| 3 | 92 | 4 | 4 | 0 | 0 | 0 | TaN | 1 |
| 4 | 95 | 2 | 3 | 0 | 0 | 0 | TaN | 1 |
| 5 | 92 | 8 | 0 | 0 | 0 | 0 | TaN | 1 |
| 6 | 93 | 7 | 0 | 0 | 0 | 0 | TaN | 1 |
| 7 | 92 | 0 | 4 | 4 | 0 | 0 | TaN | 1 |
| 8 | 92 | 0 | 2 | 6 | 0 | 0 | TaN | 1 |
| 9 | 92 | 0 | 0 | 0 | 3 | 5 | TaN | 1 |
| 10 | 90 | 0 | 0 | 0 | 2 | 8 | TaN | 1 |
| 11 | 94 | 0 | 0 | 0 | 0 | 6 | TaN | 1 |
| 12 | 90 | 2 | 3 | 5 | 0 | 0 | TaN | 1 |
| 13 | 90 | 5 | 5 | 0 | 0 | 0 | TaN | 5 |
| 14 | 95 | 2 | 3 | 0 | 0 | 0 | TaN | 5 |
| 15 | 95 | 2 | 3 | 0 | 0 | 0 | TaN | 9 |
| 16 | 92 | 8 | 0 | 0 | 0 | 0 | ZrN | 3 |
| 17 | 92 | 8 | 0 | 0 | 0 | 0 | ZrN | 3 |
| 18 | 92 | 8 | 0 | 0 | 0 | 0 | CeN | 1 |
| 19 | 92 | 8 | 0 | 0 | 0 | 0 | CeN | 1 |
| 20 | 92 | 8 | 0 | 0 | 0 | 0 | CeN | 1 |
| 21 | 92 | 8 | 0 | 0 | 0 | 0 | TaN | 1 |
| | | | | | | | CeN | 1 |
| 22 | 92 | 8 | 0 | 0 | 0 | 0 | CeN | 9.5 |
| 23 | 92 | 4 | 4 | 0 | 0 | 0 | TaN | 1 |
| 24 | 92 | 4 | 4 | 0 | 0 | 0 | TaN | 1 |
| 25 | 92 | 4 | 4 | 0 | 0 | 0 | TaN | 15 |
| 26 | 92 | 4 | 4 | 0 | 0 | 0 | TaN | 22 |
| 27 | 92 | 4 | 4 | 0 | 0 | 0 | TaN | 0.001 |
| 28 | 92 | 4 | 4 | 0 | 0 | 0 | TaN | 0 |
| 29 | 92 | 8 | 0 | 0 | 0 | 0 | MON | 3 |
| 30 | 92 | 8 | 0 | 0 | 0 | 0 | BN | 8 |
| 31 | 92 | 8 | 0 | 0 | 0 | 0 | AlN | 1 |
| 32 | 92 | 8 | 0 | 0 | 0 | 0 | AlN | 5 |
| 33 | 92 | 8 | 0 | 0 | 0 | 0 | AlN | 1 |

| Sample No. | Refractory Metal | | Sintering Temperature (° C.) | Relative Density (%) | Oxidation Weight Increase (mg/cm$_2$) | Suitability |
|---|---|---|---|---|---|---|
| | Type | Thickness of Reaction Layer | | | | |
| 1 | W | 13 | 1780 | 98.8 | 1.9 | ○ |
| 2 | W | 8 | 1780 | 98.7 | 1.3 | ○ |
| 3 | W | 6 | 1800 | 98.0 | 1.6 | ○ |
| 4 | W | 5 | 1800 | 97.6 | 1.5 | ○ |
| 5 | W | 3 | 1850 | 97.8 | 0.5 | ○ |
| 6 | W | 3 | 1850 | 98.7 | 1.2 | ○ |
| 7 | W | 14 | 1850 | 97.7 | 1.5 | ○ |
| 8 | W | 12 | 1850 | 98.0 | 1.2 | ○ |
| 9 | W | 3 | 1850 | 98.2 | 0.2 | ○ |

TABLE 1-continued

| | | | | | | |
|---|---|---|---|---|---|---|
| 10 | W | 5 | 1850 | 98.1 | 0.1 | ○ |
| 11 | W | 4 | 1900 | 98.8 | 0.1 | ○ |
| 12 | W | 11 | 1800 | 99.0 | 1.0 | ○ |
| 13 | W | 9 | 1800 | 98.7 | 1.1 | ○ |
| 14 | W | 12 | 1800 | 98.4 | 0.6 | ○ |
| 15 | W | 15 | 1800 | 97.4 | 0.4 | ○ |
| 16 | W | 8 | 1850 | 97.6 | 0.6 | ○ |
| 17 | Mo | 7 | 1850 | 98.2 | 0.7 | ○ |
| 18 | W | 14 | 1850 | 98.4 | 0.6 | ○ |
| 19 | Mo | 13 | 1850 | 98.2 | 0.3 | ○ |
| 20 | Nb | 17 | 1850 | 98.6 | 0.1 | ○ |
| 21 | W | 16 | 1850 | 97.9 | 0.7 | ○ |
| 22 | W | 8 | 1850 | 97.7 | 0.8 | ○ |
| 23 | Mo | 8 | 1800 | 98.2 | 1.2 | ○ |
| 24 | Nb | 11 | 1800 | 98.7 | 1.4 | ○ |
| 25 | W | 8 | 1800 | 97.6 | 12.5 | x |
| 26 | W | 9 | 1800 | 97.3 | Collapsed unmeasurable | x |
| 27 | W | 35 | 1800 | 98.0 | 1.7 | x |
| 28 | W | 35 | 1800 | 97.6 | 1.6 | x |
| 29 | W | 35 | 1850 | 97.8 | 1.6 | x |
| 30 | W | 45 | 1850 | 98.2 | Collapsed unmeasurable | x |
| 31 | W | 38 | 1850 | 97.2 | 11.5 | x |
| 32 | W | 42 | 1850 | 97.0 | 22.8 | x |
| 33 | Mo | 45 | 1850 | 97.4 | 19.3 | x |

Table 1 shows the example wherein the types and amounts of sintering aids were changed, and at least one kind of nitrides of Groups 3b, 4b and 5b in the element periodic table was used. Table 1 also shows the thicknesses of reaction layers on refractory metals at that time, and the oxidation weight increases per unit area upon an oxidation test in the air at 1,400° C. for 144 h. The relative densities were measured by the Archimedes method after removing the buried refractory metals.

EXAMPLE 2

Table 2 shows an example in which silicon carbide-based insulating ceramics were sintered using a hot pressing.

TABLE 2

| Sample No. | Composition of Silicon Carbide-Based Ceramics (wt %) | | | | | Added Nitride | |
|---|---|---|---|---|---|---|---|
| | SiC | $Al_2O_3$ | $H_3BO_4$ | C | $B_4C$ | Type | Amount (vol %) |
| 1 | 98 | 2 | 0 | 0 | 0 | TaN | 1 |
| 2 | 98 | 2 | 0 | 0 | 0 | TaN | 1 |
| 3 | 99 | 1 | 0 | 0 | 0 | TaN | 1 |
| 4 | 99 | 1 | 0 | 0 | 0 | TaN | 1 |
| 5 | 99.5 | 0.5 | 0 | 0 | 0 | TaN | 1 |
| 6 | 99.5 | 0.5 | 0 | 0 | 0 | TaN | 1 |
| 7 | 98 | 0 | 0 | 0 | 2 | TaN | 1 |
| 8 | 98 | 0 | 0.5 | 1.5 | 0 | TaN | 1 |
| 9 | 98.5 | 0 | 0.S | 1 | 0 | TaN | 1 |
| 10 | 99 | 1 | 0 | 0 | 0 | CeN | 1 |
| 11 | 98.5 | 0 | 0.5 | 1 | 0 | CeN | 1 |
| 12 | 99 | 1 | 0 | 0 | 0 | ZrN | 1 |
| 13 | 985 | 0 | 0.5 | 1 | 0 | ZrN | 1 |
| 14 | 99 | 1 | 0 | 0 | 0 | CeN | 9.5 |
| 15 | 99 | 1 | 0 | 0 | 0 | TaN | 1 |
| 16 | 99 | 1 | 0 | 0 | 0 | TaN | 1 |
| 17 | 99 | 1 | 0 | 0 | 0 | TaN | 15 |
| 18 | 99 | 1 | 0 | 0 | 0 | TaN | 22 |
| 19 | 99 | 1 | 0 | 0 | 0 | TaN | 0.001 |
| 20 | 99 | 1 | 0 | 0 | 0 | TaN | 0 |
| 21 | 99 | 1 | 0 | 0 | 0 | MoN | 3 |
| 22 | 99 | 1 | 0 | 0 | 0 | BN | 8 |
| 23 | 99 | 1 | 0 | 0 | 0 | AlN | 1 |
| 24 | 99 | 1 | 0 | 0 | 0 | AlN | 5 |
| 25 | 99 | 1 | 0 | 0 | 0 | AlN | 1 |

| Sample No. | Refractory Metal | | Sintering Temperature (° C.) | Relative Density (%) | Oxidation Weight Increase (mg/cm$_2$) | Suitability |
|---|---|---|---|---|---|---|
| | Type | Thickness of Reaction Layer | | | | |

TABLE 2-continued

| | | | | | | |
|---|---|---|---|---|---|---|
| 1 | W | 12 | 1950 | 98.8 | 1.1 | o |
| 2 | W | 15 | 2000 | 98.7 | 0.9 | o |
| 3 | W | 11 | 1950 | 98.0 | 0.9 | o |
| 4 | W | 8 | 2000 | 97.6 | 0.8 | o |
| 5 | W | 6 | 1950 | 97.8 | 0.4 | o |
| 6 | W | 6 | 2000 | 97.7 | 0.2 | o |
| 7 | W | 14 | 2000 | 98.4 | 1.5 | o |
| 8 | W | 12 | 2000 | 98.0 | 1.2 | o |
| 9 | W | 3 | 2000 | 98.2 | 0.2 | o |
| 10 | W | 5 | 2000 | 98.1 | 0.1 | o |
| 11 | W | 11 | 2000 | 99.0 | 1.0 | o |
| 12 | W | 8 | 2000 | 98.1 | 0.6 | o |
| 13 | Mo | 7 | 2000 | 98.2 | 0.7 | o |
| 14 | W | 9 | 2000 | 98.8 | 0.8 | o |
| 15 | Mo | 8 | 2000 | 98.2 | 1.2 | o |
| 16 | Nb | 11 | 2000 | 98.7 | 1.4 | o |
| 17 | W | 13 | 2000 | 98.2 | 12.5 | x |
| 18 | W | 9 | 2000 | 97.8 | Collapsed unmeasurabie | x |
| 19 | W | 42 | 2000 | 98.0 | 1.7 | x |
| 20 | W | 38 | 2000 | 98.3 | 1.6 | x |
| 21 | W | 35 | 2000 | 98.7 | 1.6 | x |
| 22 | W | 63 | 2000 | 97.6 | Collapsed unmeasurabfe | x |
| 23 | W | 38 | 2000 | 98.4 | 11.5 | x |
| 24 | W | 55 | 2000 | 96.7 | 22.8 | x |
| 25 | Mo | 41 | 2000 | 97.8 | 19.3 | x |

In Example 2, the types and amounts of sintering aids were changed, and nitrides of Groups 3b, 4b and 5b in the element periodic table were used. Table 2 shows the thicknesses of reaction layers on refractory metals at that time, and the oxidation weight increases per unit area upon an oxidation test in the atmosphere at 1,400° C. for 144 h.

EXAMPLE 3

230 g of silicon nitride, 20 g of yttria, 10.5 g of TaN, and a silicon nitride ball were put in a silicon nitride pot, and mixed using acetone for 24 h. A slurry formed by mixing was dried at room temperature for 24 h, and powdered in a mortar to prepare a silicon nitride-based ceramic powder containing TaN. Using this powder, a columnar green body was prepared by a uniaxial press so as to center a W coil (tungsten coil) having a purity of 99.95% and 0.2 mm in diameter. Gas-pressure sintering was performed at 1,650° C. to 1,950° C., a 50° C. step, and a pressure of 0.93 MPa. Table 3 shows the densities in the sintered body, the thicknesses of reaction layers on the W coil, and the oxidation weight increases per unit area upon an oxidation test in the atmosphere at 1,400° C. for 144 h.

EXAMPLE 4

Similar to Example 3, a silicon nitride-based ceramic powder containing TaN was prepared. A W lead having a purity of 99.95% and 0.2 mm in diameter was attached to a U-shaped heating element (sintered body) containing 33 vol % of TiN and the balance of silicon nitride-based ceramics. The obtained structure was buried in the prepared powder by a uniaxial press to form three columnar green body. Thereafter, pressureless sintering was performed at 1,850° C. The relative densities were 97.9%, 97.4%, and 98.1%, respectively.

A sintered body having a relative density of 97.9% has undergone an oxidation test in the atmosphere at 1,400° C. for 144 h. The oxidation weight increase at that time was 0.7 mg/cm$^2$. A sintered body having a relative density of 97.4% was cut, buried in a resin and polished. The thickness of a reaction layer was observed by a scanning electron microscope (SEM) with an energy dispersion X-ray analyzer (EDX). From the analysis of the EDX, a portion where both W and Si existed was defined as a reaction layer. The thickness was uniformly 8 μm. A sintered body having a relative density of 98.1% was processed to form a lead portion. A metal casing was attached to the sintered body to

TABLE 3

| Sample No. | Sintering Temperature (° C.) | Relative Density (%) | W Thickness of Reaction Layer (μm) | Oxidation Weight Increase (mg/cm$^2$) | Suitability |
|---|---|---|---|---|---|
| 1 | 1650 | 88.0 | 20 | 2.3 | x |
| 2 | 1700 | 90.0 | 27 | 1.7 | x |
| 3 | 1750 | 94.5 | 23 | 1.8 | x |
| 4 | 1800 | 97.8 | 8 | 0.8 | o |
| 5 | 1850 | 97.8 | 3 | 0.5 | o |
| 6 | 1900 | 98.6 | 6 | 0.2 | o |
| 7 | 1950 | 98.5 | 7 | 1.5 | o | fabricate a glow plug. As the characteristics of the glow plug, the rise time to 800° C. was 3.3 sec, and the saturated temperature was 1,430° C.

EXAMPLE 5

230 g of silicon nitride, 15 g of yttria, 10 g of TaN, and a silicon nitride ball were put in a silicon nitride pot, and mixed using isopropyl alcohol for 24 h. A slurry formed by mixing was dried at room temperature for 24 h, and powdered in a mortar to prepare a silicon nitride-based ceramic powder containing TaN. Using this powder, a columnar green body was prepared by a uniaxial press so as to center a W coil having a purity of 99.95% and 0.2 mm in a diameter. The resultant structure was hot-pressed at 1,850° C.

The same evaluation as in Example 4 was performed. The thickness of a reaction layer was 8 μm, and the oxidation weight increase upon an oxidation test in the atmosphere at 1,400° C. for 144 h was 0.5 mg/cm². Using this sintered body, a glow plug was fabricated. As the characteristics of the glow plug, the rise time to 800° C. was 3.0 sec, and the saturated temperature was 1,450° C.

As has been described above, according to the present invention, a refractory metal having a melting point of 2,000° C. or more, or material including an inorganic conductor is used as the material of the heating element. A refractory metal having a melting point of 2,000° C. or more is used as the material of the lead. In burying the heating element and the lead in a sintered body made of a silicon nitride- or silicon carbide-based insulating ceramic, at least one kind of nitrides of Groups 3b, 4b and 5b in the element periodic table is contained in the silicon nitride- or silicon carbide-based insulating ceramic powder at a ratio of 0.01 vol % to 10 vol %. The obtained structure is sintered at a temperature higher than 1,750° C. (e.g., about 1,800° C. for silicon nitride and about 2,100° C. to 2,200° C. for silicon carbide). As a result, a reaction layer on the refractory metal can be formed to a thickness of 20 μm or less (0 to 20 μm). For this reason, the following excellent effects can be attained.

That is, decomposition of silicon nitride or silicon carbide can be prevented in sintering a ceramic heater, reaction with the refractory metal such as silicification (formation of a reaction layer such as a tungsten silicide layer) can be prevented, and the reaction layer on the refractory metal can be suppressed to 20 μm or less in thickness of cross section. Therefore, the resistance of the heating element and the lead each made of the refractory metal can be stabilized. Since the insulating ceramics does not crack, the service life of the heating element can be prolonged.

Since the ceramic heater can be sintered at a temperature higher than 1,750° C., as described above, an yttria system or an ytterbium system as sintering aids difficult to sinter can be used in the sintered body made of, e.g., a silicon nitride-based insulating ceramics. Accordingly, a heating element formed of the sintered body excellent in high-temperature properties and the oxidation resistance can be obtained. In a sintered body made of a silicon carbide-based insulating ceramics, the refractory metal cannot be conventionally buried and sintered at higher than 1,750° C. According to the present invention, however, since reaction with the refractory metal can be prevented, the silicon carbide-based ceramic can be sintered at a high temperature.

Particularly, as for a ceramics sintered body made of an insulating ceramics, generation of a reaction layer such as a tungsten silicide layer at a buried refractory metal portion can be prevented, the resistance can be kept stable, and the sintering temperature can be set higher. For this reason, sintering aids which cannot be conventionally sintered at around 1,700° C. can be used, and the amount of sintering aids can be reduced. A silicon carbide-based ceramic heating element having a high sintering temperature can also be realized. Further, pressureless or gas-pressure sintering can be performed.

What is claimed is:

1. A ceramic heater comprising:
   a heating element formed of a material containing one of a refractory metal having a melting point of not less than 2,000° C., and an inorganic conductive material; and
   a sintered body of an insulating ceramic containing one of silicon nitride and silicon carbide materials, said heating element being buried in said sintered body, wherein the insulating ceramic contains at least one kind of nitride of an element selected from a first sub-group 3b, a second sub-group 4b, and a third sub-group 5b in an element periodic table at a ratio of 0.01 vol % to 10 vol %.

2. A heater according to claim 1, wherein said ceramic heater is formed by sintering a powder of the insulating ceramic in which said heating element is buried, at a temperature higher than 1,750° C.

3. A heater according to claim 1, further comprising:
   a pair of leads connected to two end portions of said heating element and made of a refractory metal having a melting point of not less than 2,000° C., and
   wherein said heating element and said leads are buried in said sintered body.

4. A heater according to claim 3, further comprising:
   a pair of control heating elements which are connected between said heating element and end portions of said leads, and made of a refractory metal having a melting point of not less than 2,000° C. to control a temperature of said heating element, and
   wherein said heating element, said control heating elements, and said leads are buried in said sintered body.

5. A method of manufacturing a ceramic heater, comprising steps of:
   forming at least a heating element using a material containing one of a refractory metal having a melting point of not less than 2,000° C., and an inorganic conductive material;
   burying said heating element and a pair of leads connected to two ends of said heating element in an insulating ceramic powder containing one of silicon nitride and silicon carbide materials, the insulating ceramic powder containing at least one kind of nitride of an element selected from a first sub-group 3b, a second sub-group 4b, and a third sub-group 5b in an element periodic table at a ratio of 0.01 vol % to 10 vol %; and
   sintering the insulating ceramic powder in which said heating element and said leads are buried.

6. A method according to claim 5, wherein the step of burying said heating member and said leads comprises steps of:
   containing at least one kind of nitride of an element selected from a first sub-group 3b, a second sub-group 4b, and a third sub-group 5b in the element periodic table in the insulating ceramic powder at a ratio of 0.01 vol % to 10 vol %, and burying said heating element and said leads in the insulating ceramic powder containing the nitride.

7. A method according to claim 5, wherein the step of sintering the insulating ceramic powder comprises the step of sintering the insulating ceramic powder in which said heating element and said leads are buried, at a temperature higher than 1,750° C.

8. A method according to claim 5, further comprising the step of forming said leads of a refractory metal having a melting point of not less than 2,000° C.

9. A ceramic heater comprising:
a heating element formed of a material containing one of a refractory metal having a melting point of not less than 2,000° C., and an inorganic conductive material; and
a sintered body of an insulating ceramic containing one of silicon nitride and silicon carbide materials, said heating element being buried in said sintered body, wherein the insulating ceramics contains at least one kind of nitride selected from the group consisting of YN, TiN, ZrN, NbN, and TaN at a volume percentage of between about 0.01–10%.

10. A heater comprising:
a lead of a metal selected from the group consisting of W, Mo, Nb, Hf, and Ir electrically coupled to
a heating element, the heating element and at least a portion of the lead being buried in
a sintered body of an insulating silicon-containing ceramic material, the insulating silicon-containing ceramic material including at least one nitride selected from the group consisting of YN, TiN, ZrN, NbN, and TaN, at between about 0.01–10 volume %.

11. A heater comprising:
a heating element of a silicide-forming metal having a melting point above about 1,750° C. buried in
a sintered body of an insulating silicon-containing ceramic, the silicon-containing ceramic including at least one nitride selected from the group consisting of YN, TiN, ZrN, NbN, and TaN, at between about 0.01–0 volume %.

12. A ceramic heater comprising:
a heating element formed of a material containing one of a refractory metal having a melting point of not less than 2,000° C., and an inorganic conductive material; and
a sintered body of an insulating ceramic containing one of silicon nitride and silicon carbide, the insulating ceramic further containing TaN at a ratio of between about 0.01–10 vol %, the heating element being buried in the sintered body.

13. A ceramic heater comprising:
a heating element formed of a material containing one of a refractory metal having a melting point of not less than 2,000° C., and an inorganic conductive material; and
a sintered body of an insulating ceramic containing one of silicon nitride and silicon carbide materials, said heating element being buried in said sintered body, wherein the insulating ceramic contains at least one kind of nitride of an element selected from a first sub-group 3b, a second sub-group 4b, and a third sub-group 5b in an element periodic table at a ratio of less than 5% by weight.

* * * * *